United States Patent
Yun et al.

(10) Patent No.: US 8,819,322 B2
(45) Date of Patent: Aug. 26, 2014

(54) SYSTEM ON CHIP COMPRISING INTERCONNECTOR AND CONTROL METHOD THEREOF

(75) Inventors: Jaegeun Yun, Hwaseong-si (KR); Sung-Min Hong, Hwaseong-si (KR); Bub-chul Jeong, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 270 days.

(21) Appl. No.: 13/396,155

(22) Filed: Feb. 14, 2012

(65) Prior Publication Data

US 2012/0215955 A1 Aug. 23, 2012

(30) Foreign Application Priority Data

Feb. 22, 2011 (KR) .................. 10-2011-0015688

(51) Int. Cl.
*G06F 13/14* (2006.01)

(52) U.S. Cl.
USPC .......................................... 710/110; 710/105

(58) Field of Classification Search
CPC . G06F 13/14; G06F 13/1615; G06F 13/1621; G06F 13/20; G06F 13/36; G06F 13/364; G06F 13/42; G06F 2213/0054
USPC .................. 710/100, 105, 110, 112, 306, 310
See application file for complete search history.

(56) References Cited

U.S. PATENT DOCUMENTS

| 7,028,121 | B2 | 4/2006 | Chae |
| 7,263,566 | B2 | 8/2007 | Ganasan et al. |
| 2011/0106991 | A1* | 5/2011 | Kawahito ...................... 710/110 |
| 2012/0079154 | A1* | 3/2012 | Mangano et al. ............. 710/112 |
| 2012/0089758 | A1* | 4/2012 | Yun et al. ...................... 710/110 |
| 2012/0096199 | A1* | 4/2012 | Lee et al. ...................... 710/105 |
| 2012/0096200 | A1* | 4/2012 | Jeong et al. ................... 710/110 |
| 2012/0131246 | A1* | 5/2012 | Jeong et al. ................... 710/110 |
| 2012/0159037 | A1* | 6/2012 | Kwon et al. .................. 710/317 |

FOREIGN PATENT DOCUMENTS

| JP | 2004-133946 | | 4/2004 |
| JP | 2008-527498 | A | 7/2008 |
| JP | 2009-093283 | | 4/2009 |
| KR | 1020040033472 | A | 4/2004 |
| KR | 1020070098896 | A | 10/2007 |
| WO | WO 2006/073927 | A1 | 7/2006 |

OTHER PUBLICATIONS

AMBA AXI Protocol v1.0 Specification; ARM Limited; pp. 1-2~1-10,3-1~3-8, and 8-1~8-10; 2004.*

* cited by examiner

*Primary Examiner* — Glenn A Auve
(74) *Attorney, Agent, or Firm* — Myers Bigel Sibley & Sajovec, PA

(57) ABSTRACT

A system on chip includes a plurality of master devices, a plurality of slave devices that supply data in response to requests of the plurality of master devices and pointer update logic configured to process the requests from the plurality of master devices sequentially in a pipeline manner.

13 Claims, 5 Drawing Sheets

SYSTEM ON CHIP COMPRISING INTERCONNECTOR AND CONTROL METHOD THEREOF

CROSS-REFERENCE TO RELATED APPLICATIONS

This application claims the benefits under 35 U.S.C §119 of Korean Patent Application No. 10-2011-0015688 filed Feb. 22, 2011, the entirety of which is incorporated by reference herein.

BACKGROUND

1. Field

Exemplary embodiments relate to a semiconductor device, and, more particularly, relate to a system on chip including an interconnector and a control method thereof.

2. Description of the Related Art

A system on chip SOC may use semiconductor techniques that enable a complicated system with various functions to be realized in one chip. Effective connecting of various intellectual properties (IPs) formed within a chip may become an important issue for the high functionality and the high performance of a system on chip. Typically, interconnector techniques for connecting intellectual properties are mainly bus-based connections.

Meanwhile, the advanced microcontroller bus architecture (AMBA) introduced by ARM Ltd. may be used as a standardized bus protocol for connection and management of intellectual properties within a system on chip. Bus protocols of the AMBA may include the advanced high-performance bus (AHB) protocol, the advanced peripheral bus (APB) protocol, the advanced extensible interface (AXI) protocol, etc. Among the bus protocols of the AMBA, the AXI protocol may include advanced functions, such as a multiple outstanding address function, a data interleaving function, etc.

With the multiple outstanding address function, addresses corresponding to a plurality of transactions may be provided at the same time. The multiple outstanding address function may mean that addresses on a plurality of transactions are continuously transferred through an address channel together with a data transfer when information is provided through an address channel and a data channel. It is possible to use a free transfer time generated between addresses on a plurality of transactions by the above-described function.

With the data interleaving function, data provided from a master IP may be uniformly assigned to a plurality of slave intellectual properties. It is possible to use bandwidth more effectively by using the data interleaving function.

SUMMARY

One aspect of embodiments of the inventive concept is directed to providing a system on chip comprising a plurality of master devices; a plurality of slave devices that supply data in response to requests of the plurality of master devices; and pointer update logic configured to process the requests from the plurality of master devices sequentially in a pipeline manner.

Another aspect of embodiments of the inventive concept is directed to providing a method of controlling an interconnector of a system on chip configured to transfer requests from a master device to a plurality of slave devices. The method comprises storing a first payload corresponding to a first request in a temporal register; selectively storing the first payload stored in the temporal register in a register slice unit and storing a second payload corresponding to a second request in the temporal register; and comparing a third payload corresponding to a third request with the first payload stored in the register slice unit and the second payload stored in the temporal register.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
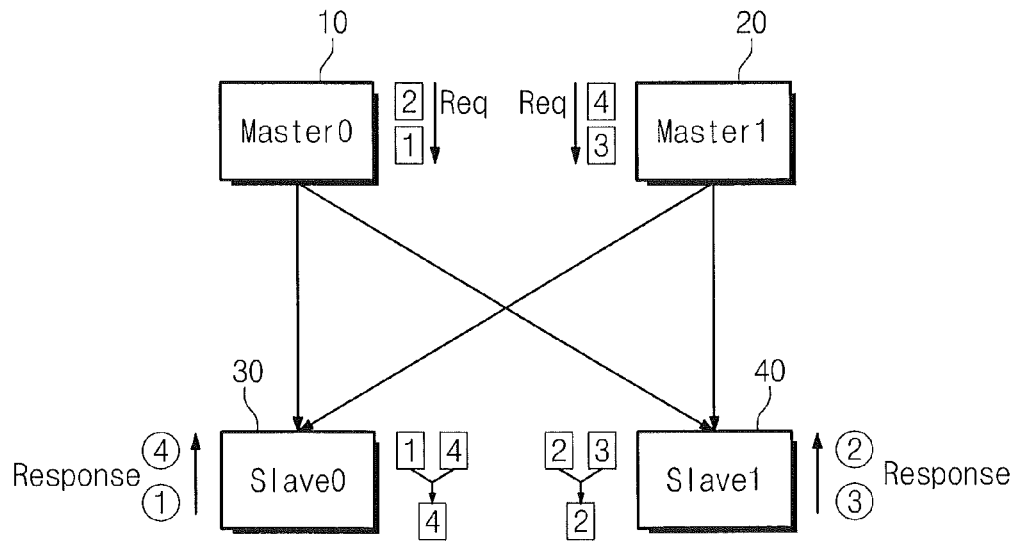
FIG. 1 is a block diagram that illustrates a deadlock condition of a system on chip.

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout the description of the figures.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Below, the inventive concept will be described using a bus system which an AXI protocol is applied to.

FIG. 1 is a diagram that illustrates a deadlock condition of a system on chip. Referring to FIG. 1, it is assumed that a system on chip includes two master devices 10 and 20 and two slave devices 30 and 40. But, a typical system on chip may include two or more master devices and two or more slave devices.

The master device 10 may send the first request 1 and the second request 2 sequentially to an interconnector (not shown). The master device 20 may send the third request 3 and the fourth request 4 sequentially to the interconnector. The slave device 30 may receive the first and fourth requests 1 and 4 through the interconnector, and the slave device 40 may receive the second and third requests 2 and 3 through the interconnector.

Herein, the first and fourth requests 1 and 4 transferred from different master devices may fight for priority within the slave device 30. In the slave device 30, it is assumed that the fourth request 4 obtains a priority through the fighting and is processed first. Further, the second and third requests 2 and 3 transferred from different master devices may fight for priority within the slave device 40. In the slave device 40, it is assumed that the second request 2 obtains a priority through the fighting and is processed first.

Under the above conditions, the slave device 30 may process the fourth request 4 of the two requests first to send the processed result to the interconnector. Accordingly, the slave device 30 may sequentially generate responses 4 and 1 on the fourth and first requests 4 and 1 in this order, respectively. The slave device 40 may process the second request 2 of the two requests first to send the processed result to the interconnector. Accordingly, the slave device 40 may sequentially generate responses 2 and 3 on the second and third requests 2 and 3 in this order, respectively. But, the first request 1 is generated from the master device 10 first. For this reason, if the first response 1 is not provided first, the master device 10 may not perform a following operation. If the third response 3 is not provided first to the master device 20, the master device 20 may not carry out a following operation. As a result, the responses 1 and 3 required for the following operations of the master devices 10 and 20 may not be transferred by the slave devices 30 and 40. In this case, a normal operation of the system on chip may not be carried out. This state may be called a deadlock of the interconnector.

Thus, various connector techniques for escaping the deadlock may exist. In particular, a cyclic scheme may control mutual communications in such a manner that one transaction ID is assigned to one slave device.

Figure 2:
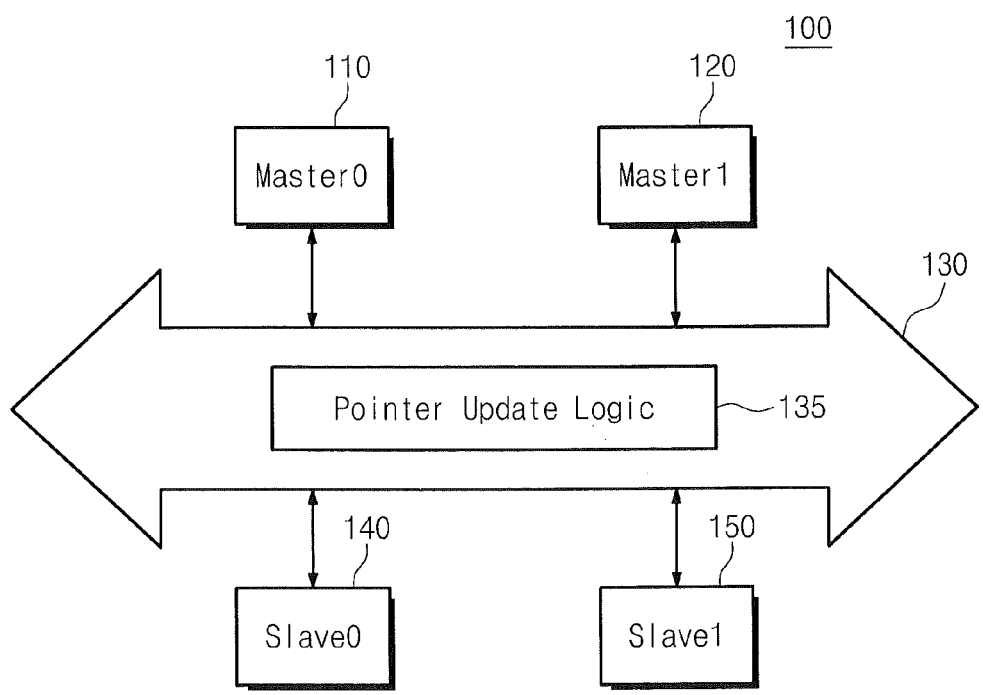
FIG. 2 is a block diagram of a system on chip according to an exemplary embodiment of the inventive concept.

FIG. 2 is a block diagram of a system on chip according to an exemplary embodiment of the inventive concept. Referring to FIG. 2, a system on chip 100 according to an exemplary embodiment of the inventive concept may include a plurality of master devices 110 and 120, an interconnector 130, and a plurality of slave devices 140 and 150, Herein, the slave devices 140 and 150 may be formed of a memory device and a memory controller.

The plurality of master devices 110 and 120 may be formed of a CPU, a microcontroller, or a microprocessor, generally. Each of the plurality of master devices 110 and 120 may request access to the plurality of slave devices 140 and 150. If a grant signal is received from the interconnector 130, one of the plurality of master devices 110 and 120 may obtain bus ownership and send address and control information for accessing to the plurality of slave devices 140 and 150 into the interconnector 130, A master device having the bus ownership may perform a read or write operation on one or more slave devices via the interconnector 130.

The interconnector 130 may control connections between the master devices 110 and 120 and the slave devices 140 and 150 within the system on chip 100. Typically, the interconnector 130 may arbitrate requests of the master devices 110 and 120. The interconnector 130 may perform roles of an arbiter and a decoder and support a multi-layer bus, The interconnector 130 may be called a bus, and a plurality of master devices and a plurality of slave devices may be connected with the interconnector 130.

The interconnector 130 may receive address and control information from a master device having a bus ownership of the master devices 110 and 120, The interconnector 130 may send a data process ready request to the slave devices 140 and 150 based on the received address and control information, After a requested data process operation is executed at the slave devices 140 and 150, the interconnector 130 may send a response on the request to a corresponding master device.

The interconnector 130 may include at least five channels between the master devices 110 and 120 and the slave devices 140 and 150. That is, the interconnector 130 may include channels for transferring a read address, read data, a write address, write data, and a write response, respectively. The channels may operate independently. For improvement of the system performance, an AXI protocol may support a multiple outstanding transaction function, a data re-ordering function, etc. A transaction ID may be used to perform the multiple outstanding transaction function and the data re-ordering function.

The interconnector 130 may manage a transaction ID in a cyclic scheme to efficiently control outstanding requests from the plurality of master devices 110 and 120. That is, the interconnector 130 may store transaction IDs and directions of the outstanding requests. If a new request (including a transaction ID and a direction) is received, the interconnector 130 may compare the newly received transaction ID and direction with a stored transaction ID and direction. Based on the comparison, the interconnector 130 may transfer the new request to slave devices or may cut it off.

In particular, the interconnector 130 according to an exemplary embodiment of the inventive concept may process a handshake channel (VALID, READY signal) and a payload (transaction ID, direction information) on a request in a pipeline manner. The interconnector 130 according to an exemplary embodiment of the inventive concept may include a register to process the handshake channel (VALID, READY signal) and the payload in the pipeline manner.

The interconnector 130 may compare currently received request information with information on outstanding requests. The interconnector 130 may interrupt a transaction having the same transaction ID and a different direction. The interconnector 130 may bypass remaining requests other than the transaction to slave devices.

It is possible to add or delete a slot by counting a request number and a response number on previous requests transferred by the same transaction ID. In this case, requests on one transaction ID may be monitored independently without referring other payloads. If a transaction ID among outstanding transaction IDs has the same request number and response number when a response is transferred from a slave device, a list need not be managed anymore. For this reason, the list may be deleted.

Further, the interconnector 130 according to an exemplary embodiment of the inventive concept may arbitrate responses of the slave devices 140 and 150. A request having the same transaction ID may be sent to the slave devices 140 and 150, respectively. A response corresponding to the same transaction ID may be transferred to the interconnector 130 from the slave devices 140 and 150, respectively. At this time, the interconnector 130 may receive memory data corresponding to the same transaction ID. The interconnector 130 may temporarily store received data, reconfigure the order, and send it to the master device 110, 120 issuing a request. That is, the interconnector 130 may send response data corresponding to the same transaction ID to a master device in a request order of the master device, not in such an order that data is transferred from memory devices.

The slave devices 140 and 150 may correspond to a slave intellectual property (IP) which is electrically connected with the interconnector 130. Each of the slave devices 140 and 150 may be formed of a memory controller and a memory device.

The interconnector 130 of the system on chip 100 may effectively reduce a critical path of a channel generated between a master device and a slave device. Accordingly, it may be possible to increase a bus clock limited due to the critical path and to increase a capacity of a processed request.

Figure 3:
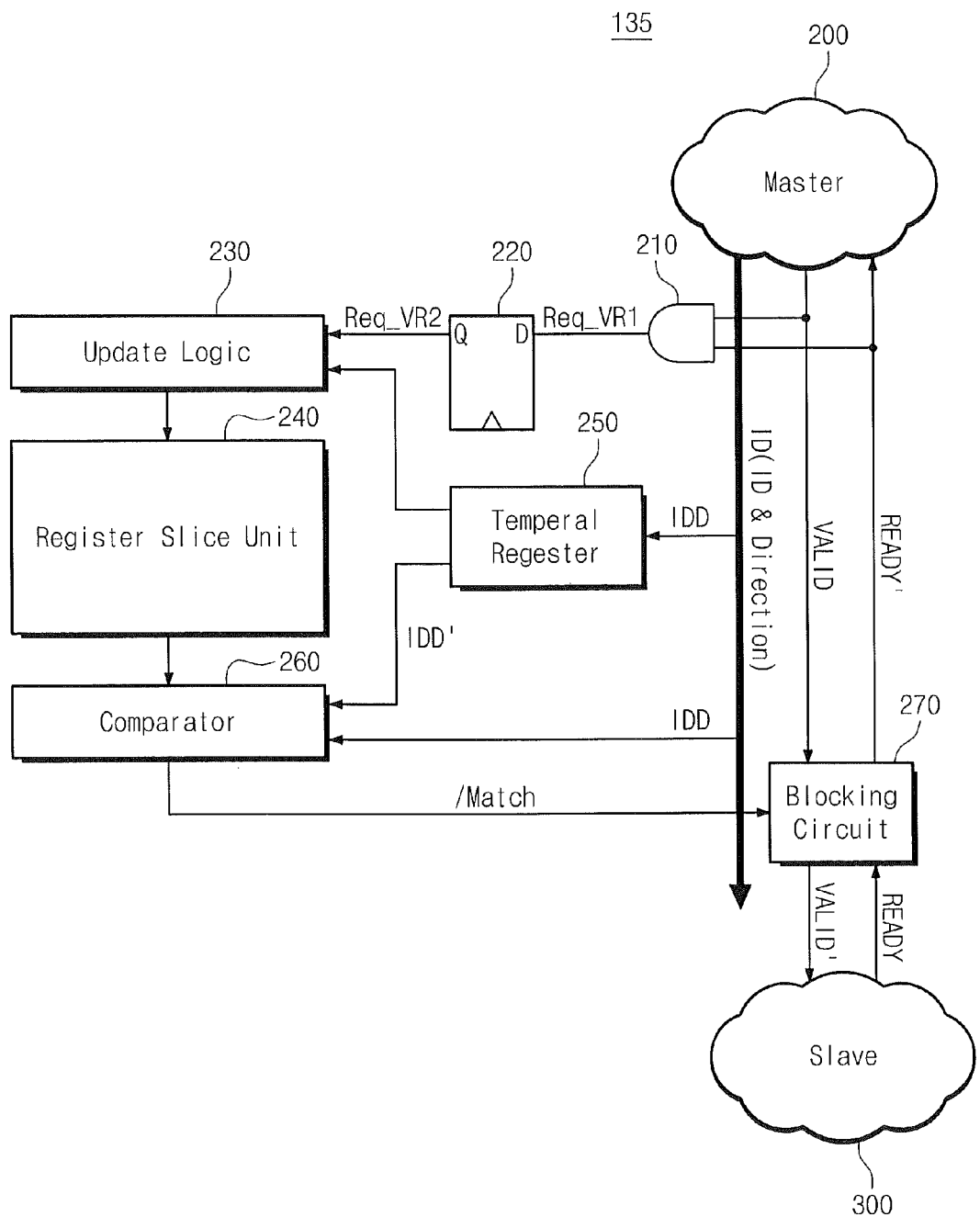
FIG. 3 is a block diagram of the pointer update logic of FIG. 2 according to an exemplary embodiment of the inventive concept.

FIG. 3 is a block diagram of pointer update logic of FIG. 2. Referring to FIG. 3, pointer update logic 135 according to an exemplary embodiment of the inventive concept may include AND logic 210, a flip-flop 220, update logic 230, register slice unit 240, a temporal register 250, a comparator 260, and a blocking circuit 270.

The AND logic 210 may receive a ready signal READY and a valid signal VALID constituting a handshake channel. The AND logic 210 may logically combine the'signals READY and VALID to transfer a combined result to the flip-flop 220.

The flip-flop 220 may store an output of the AND logic 210 in synchronization with a clock. Accordingly, a signal of the handshake channel may be delayed by the clock through an insertion of the flip-flop 220, and the delayed signal may be transferred to the update logic 230.

The update logic 230 may receive a state of the handshake channel provided through the flip-flop 220 and a payload (transaction ID, direction information) provided from the temporal register 250. The update logic 230 may control a plurality of registers provided within the register slice unit 240. The update logic 230 may add, in the register slice unit 240, a request received by a transaction ID different from a request stored in the register slice unit 240. But, the update logic 230 may not add, in the register slice unit 240, a request received by a transaction ID identical to a request stored in the register slice unit 240. In this case, the update logic 230 may count a request number and a response number to update the counted values.

For example, the update logic 230 may only update the register slice unit 240 with respect to a transaction ID, which is previously stored in the register slice unit 240. At the same time, if a payload is received by a transaction ID identical to a transaction ID stored in the register slice unit 240 or the temporal register 250, the comparator 260 may shut off the blocking circuit 270. The update logic 230 may delete such a transaction ID that a response to a request is generated from the register slice unit 240.

The register slice unit 240 may store information on a received request. That is, transaction ID and direction information of received requests may be stored in registers, respectively. In particular, state information of a transaction ID may be stored and updated with transaction ID and direction information in each register. The state information may include an occupy state Occupy, a request number REQcnt, and a response number RSPcnt. Each register of the register slice unit 240 may be assigned to a new register slice according to state information. Or, each register of the register slice unit 240 may be reset according to state information.

The temporal register 250 may temporarily store transaction ID and direction information IDD provided from a source (e.g., a master device). The temporal register 250 may transfer the stored transaction ID and direction information IDD to the update logic 230. The temporal register 250 may transfer the stored transaction ID and direction information IDD to the comparator 260. The temporal register 250 may be managed by the comparator 260 similar to registers of the register slice unit 240, other than a role of temporarily storing transaction ID and direction information IDD.

The comparator 260 may compare currently received transaction ID and direction information IDD (hereinafter, referred to as a payload) with payloads of outstanding requests stored in the register slice unit 240. Further, the comparator 260 may compare a payload IDD of a currently input request with a previously provided payload stored in the temporal register 250. The comparator 250 may activate a match signal/Match when the currently input payload IDD is identical to one of payloads stored in the register slice unit 240 and/or the temporal register 250.

The blocking circuit 270 may bypass or cut off a valid signal VALID and a response signal READY transferred through the handshake channel according to whether the match signal/Match is activated or not.

According to an exemplary embodiment of the inventive concept, the update logic 230 may update path information according to a state of a handshake channel and input transaction ID and direction information IDD. The register slice unit 240, the temporal register 250, and the comparator 260 may be formed of a content addressable memory (CAM).

Figure 4:
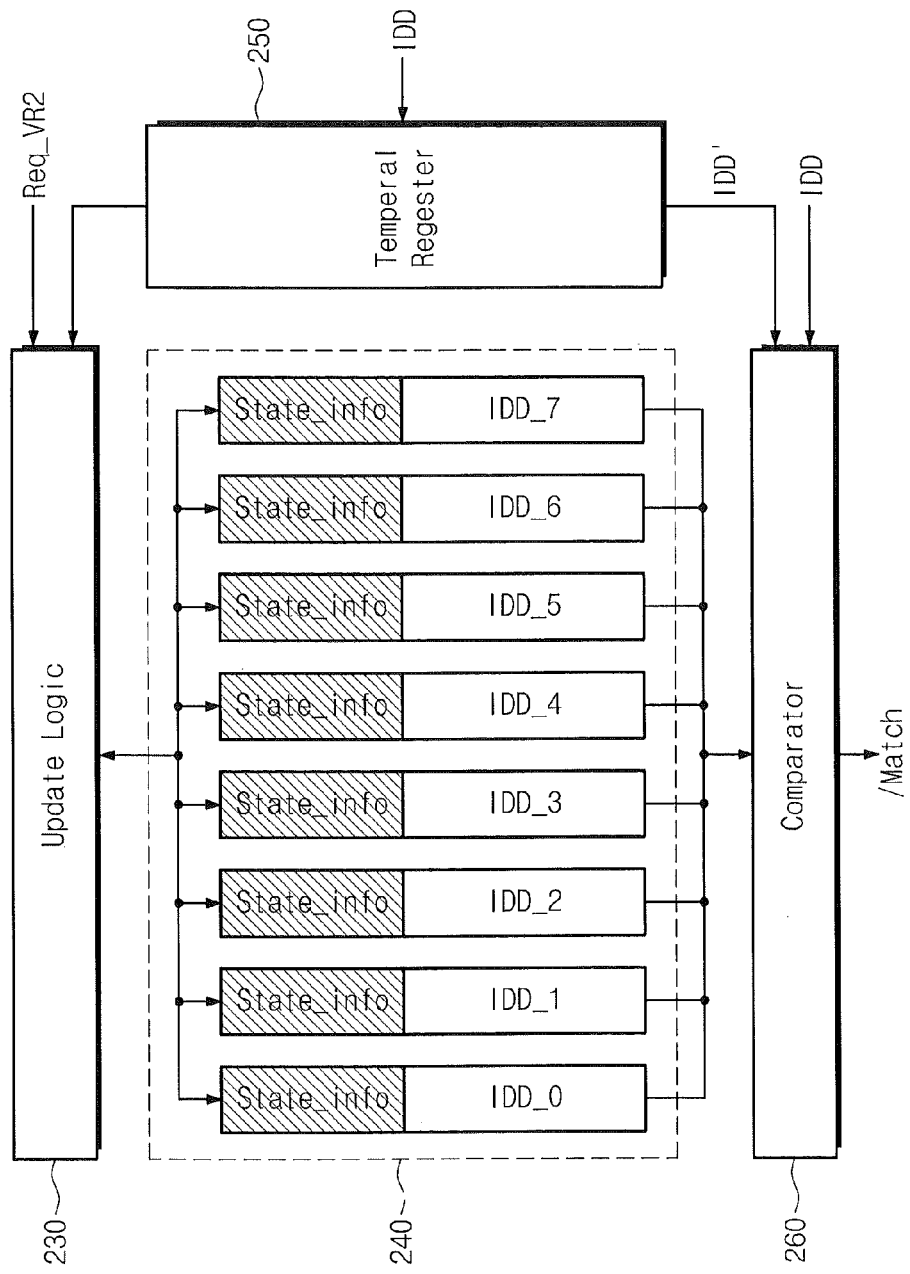
FIG. 4 is a detailed block diagram of a part of the pointer update logic of FIG. 3 according to an exemplary embodiment of the inventive concept.

FIG. 4 is a detailed block diagram of a part of the pointer update logic 230 of FIG. 3 according to some embodiments of the inventive subject matter. In FIG. 4, there are illustrated update logic 230 formed of combination logic, a register slice unit 240, a temporal register 250, and a comparator 260.

The update logic 230 may receive a flag signal Ref_VR2 provided from a flip-flop 220 and a payload IDD provided from the temporal register 250. The update logic 230 may update registers of the register slice unit 240 based on a logic level of the flag signal Reg_VR2. The update logic 230 may update registers of the register slice unit 240 with respect to requests having the same transaction ID. That is, the update logic 230 may update state information corresponding to payloads corresponding to the same transaction ID. The state information may include an occupy state Occupy, a request number REQcnt and a response number RSPcnt.

The occupy state Occupy may indicate whether payload information exists at a corresponding register. The request number REQcnt may represent a request number on the same transaction ID, that is, payload information stored in a corresponding register. The response number RSPcnt may indicate the number of responses on the same transaction ID provided from a slave device. When the request number REQcnt and the response number RSPcnt become identical, may mean completion of a requested process. In this case, the update logic 230 may delete corresponding list information of the register slice unit 240. As described above, the update logic 230 may update state information of the register slice unit 240 or delete list information on a completed request.

In particular, the update logic 230 may load a payload (transaction ID and direction information) stored in the temporal register 250 onto any one register of the register slice unit 240. If a payload stored in the temporal register 250 has a transaction ID different from those of payloads stored in the register slice unit 240, it may be stored in an empty register. The update logic 230 may generate and manage state information described with respect to a payload shifted into the register slice unit 240.

The comparator 260 may compare a payload IDD on an input request with payloads stored in the register slice unit 240 and the temporal register 250. If the currently input payload IDD is identical to at least one of the payloads stored in the register slice unit 240 and the temporal register 250, the comparator 260 may activate a match signal/Match. If the match signal/Match is activated, the currently input request may be cut off.

Figure 5:
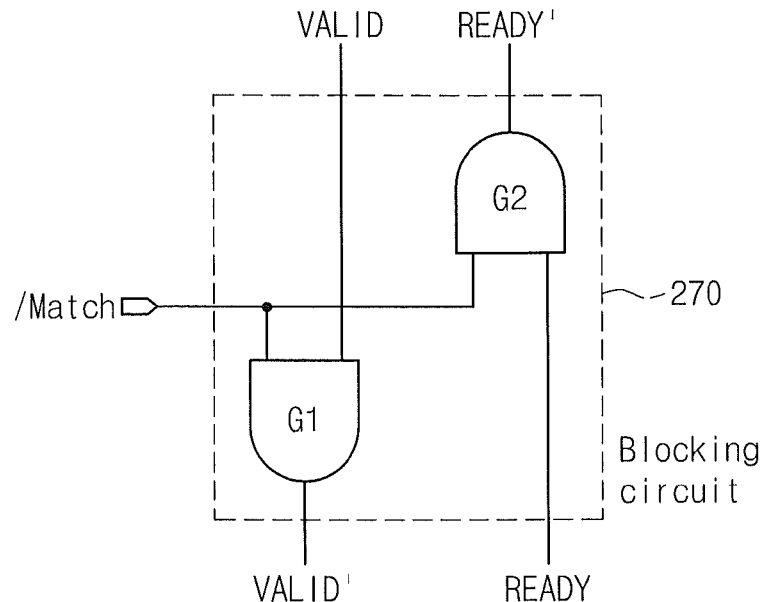
FIG. 5 is a circuit diagram of a block circuit of FIG. 3 according to an exemplary embodiment of the inventive concept.

FIG. 5 is a circuit diagram of the blocking circuit of FIG. 3 according to some embodiments of the inventive subject matter. Referring to FIG. 5, when a match signal/Match is logically '1', a blocking circuit 270 may transfer a valid signal VALID provided from a master device into a slave device without modification. On the other hand, when the match signal/Match is logically '0', the blocking circuit 270 may not pass the valid signal VALID from a master device to a slave device. This pass and shut-off operation may be executed through an AND logic gate G1, for example.

When a match signal/Match is logically '1', the blocking circuit 270 may transfer a response signal READY provided from a slave device into a master device without modification. On the other hand, when the match signal/Match is logically '0', the blocking circuit 270 may not pass the response signal READY from a slave device to a master device. This pass and shut-off operation may be executed through an AND logic gate G2, for example.

Figure 6:
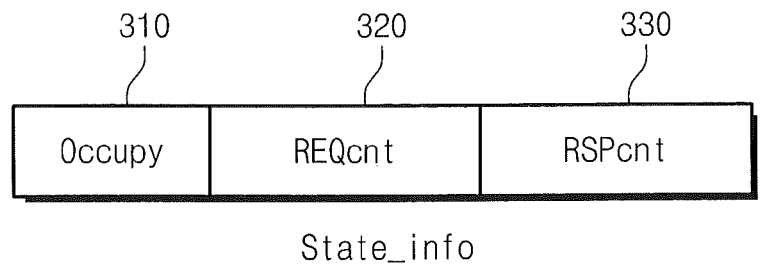
FIG. 6 is a diagram illustrating the state information of FIG. 4 according to an exemplary embodiment of the inventive concept.

FIG. 6 is a diagram representing state information described in FIG. 4. Referring to FIG. 6, state information may include an occupy state (represented by Occupy) 310, a request number (represented by REQcnt) 320, and a response number (represented by RSPcnt) 330.

The occupy state 310 may indicate whether a payload, stored in registers of a register slice unit 240, corresponding to state information is actually valid. In the event that the occupy state 310 is an active state (e.g., logically '1'), a corresponding payload may be considered to be valid. Accordingly, payload information may be consistently used for a comparison operation of a comparator 260. On the other hand, if the occupy state 310 is an inactive sate (e.g., logically '0'), the update logic 230 and the comparator 260 may consider a corresponding payload to be empty. When the occupy state 310 is at an inactive state, the update logic 230 may assign a corresponding register to a payload received by a new transaction ID. Accordingly, if a payload corresponding to a new ID is received in the temporal register 250, the update logic 230 may copy it from the temporal register 250 to an empty register.

The update logic 230 may temporarily store transaction ID and direction information provided from a source (e.g., a master device). The temporal register 250 may send stored transaction ID and direction information to the update logic 230. The temporal register 250 may provide the comparator 260 with transaction ID and direction information. The temporal register 250 may be managed by the comparator 260 like registers of the register slice unit 240, other than a role of temporarily storing transaction ID and direction information.

The request number 320 may represent the number of requests of an ID corresponding to a payload. The update logic 230 may count the request number 230 corresponding to the same transaction ID provided through a handshake channel. The counted request number may be added or updated at a new field of the register slice unit 240.

The response number 330 may indicate the number of responses on requests of an ID corresponding to a payload. A response READY transferred via the handshake channel may be counted in number by the update logic 230. The counted value may be added or updated at a field, being separate from a corresponding payload, included in the register slice unit 240.

Figure 7:
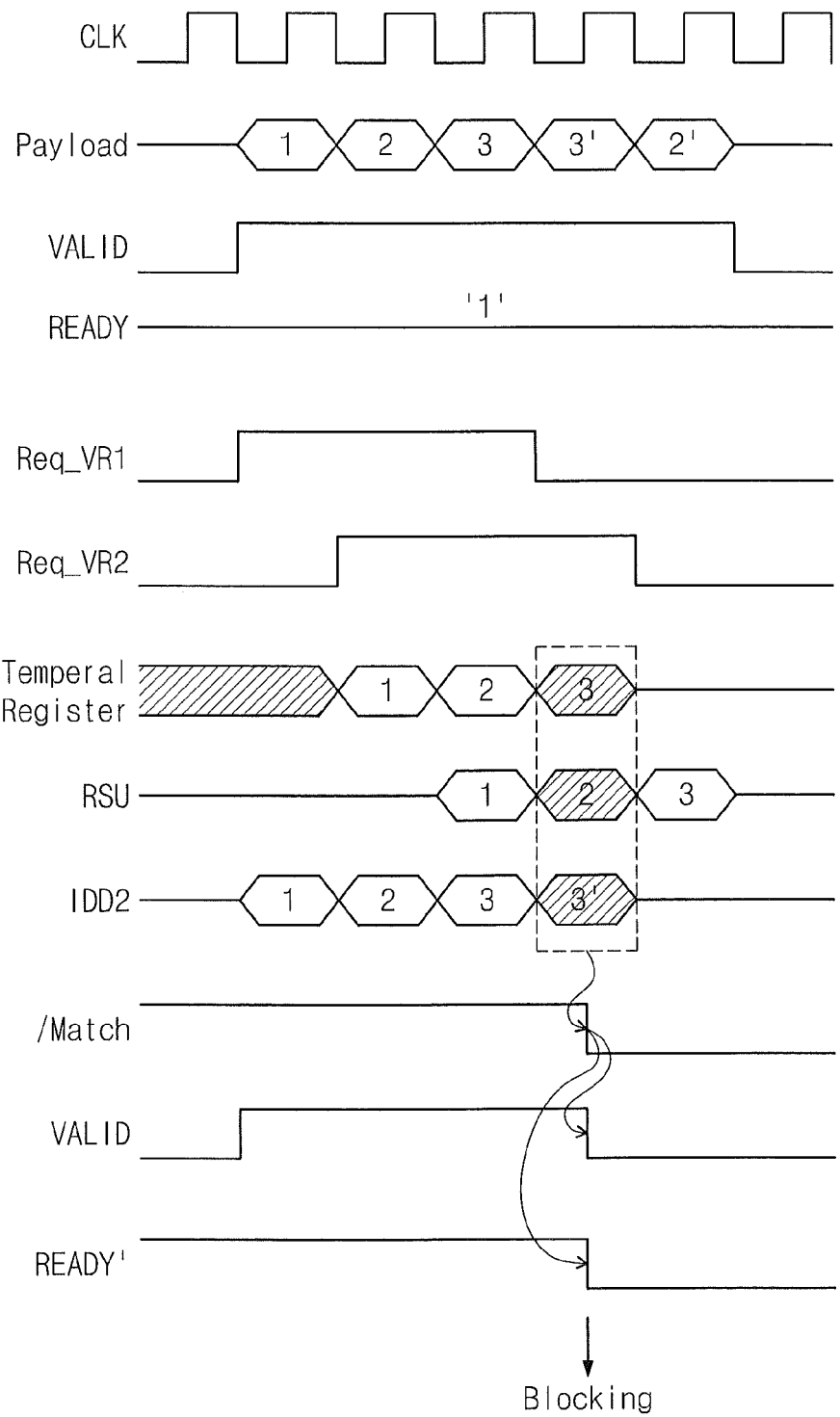
FIG. 7 is a timing diagram of operations of a system on chip according to an exemplary embodiment of the inventive concept.

FIG. 7 is a timing diagram of a process method according to an exemplary embodiment of the inventive concept. Referring to FIG. 7, pointer update logic 135 in FIG. 2 may shut off a request signal VALID at a request having the same ID as at least one of the outstanding requests. This will be more fully described below.

It is assumed that a plurality of requests is sequentially generated from a master device. For example, it is assumed that requests are received in this order of 1→2→3→3'→2'. Herein, the request 3' may have the same transaction ID as the request 3, while it may have a direction different from the request 3. Accordingly, the pointer update logic 135 may store requests (1→2→3) sequentially in a register slice unit 240 and a temporal register 250.

Then, if the request 3' is received, a comparator 260 may compare the request 3' with the request 3 stored in the temporal register 250. Accordingly, a match signal/Match may be activated (logically '0') and a blocking circuit 270 may shut off a handshake channel. During a clock time when the request 3' is shut off, the update logic 230 may update state information on the request 3 and write a payload corresponding to the request 3 stored in the temporal register 250 in an empty slot of the register slice unit 240.

A semiconductor device (e.g., a memory device or/and a memory controller) according to an exemplary embodiment of the inventive concept may be packed by various packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

According to an exemplary embodiment of the inventive concept, it is possible to effectively manage requests based on transaction IDs provided from master devices. Further, it is possible to extend a bandwidth by reducing the number of gates needed for a control operation.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A system on chip comprising:
a plurality of master devices;
a plurality of slave devices configured to supply data in response to requests received from the plurality of master devices; and
pointer update logic configured to process the requests of the plurality of master devices sequentially in a pipeline manner;
wherein the pointer update logic comprises:
a flip-flop configured to store a state of a handshake channel and to generate the state of the handshake channel at an output thereof;
a temporal register configured to temporarily store a respective payload for each one of the requests;
a register slice unit configured to store unique payloads for ones of the outstanding requests;
update logic configured to transfer a payload stored in the temporal register to the register slice unit responsive to the state of the handshake channel output from the flip-flop; and
a comparator configured to compare a payload corresponding to a currently input request with outstanding payloads stored in the temporal register and the register slice unit.

2. The system on chip of claim 1, wherein the update logic is configured to transfer a payload stored in the temporal register to the register slice unit when a transaction ID of the payload stored in the temporal register is different from transaction IDs of the payloads stored in the register slice unit.

3. The system on chip of 1, wherein when a transaction ID of a payload stored in the temporal register is identical to one of transaction IDs of payloads stored in the register slice unit, the update logic updates state information for a payload stored in the register slice unit corresponding to the payload stored in the temporal register.

4. The system on chip of claim 3, wherein the state information comprises an occupy state indicating whether a register of the register slice unit storing the state information is occupied, a number of requests received by a same transaction ID, and a number of responses of the plurality of slave devices for the request corresponding to the same transaction ID.

5. The system on chip of claim 4, wherein the update logic inactivates the occupy state at a point of time when the number of requests equals the number of responses.

6. The system on chip of claim 1, wherein the pointer update logic further comprises a blocking circuit configured to block signals on the handshake channel responsive to a comparison output from the comparator.

7. The system on chip of claim 6, wherein the blocking circuit is configured to block signals on the handshake channel when a transaction ID corresponding to a payload of a currently input request is identical to transaction IDs of payloads stored in the temporal register and/or the register slice unit and direction information of the payload of the currently input request is different as determined by the comparator.

8. The system on chip of claim 1, wherein the register slice unit comprises a content addressable memory.

9. The system on chip of claim 1, wherein the pointer update logic further comprises an AND circuit that logically combines signals constituting the handshake channel, the output signal of the AND circuit being transferred as an input signal to the flip-flop.

10. The system on chip of claim 9, wherein the handshake channel comprises a valid signal VALID provided from one of the plurality of master devices and a ready signal READY provided from one of the plurality of slave devices.

11. A system on chip, comprising:
an interconnector circuit that is configured to manage the processing of requests between a plurality of master devices and a plurality of slave devices such that the requests from the plurality of master devices are transferred to the plurality of slave devices based on a comparison of a payload of a current one of the requests with payloads of previous ones of the requests; and
a blocking circuit that is configured to block the transfer one of the requests from the plurality of master devices to the plurality of slave devices when the transaction identification of the one of the requests corresponds to a previous transaction identification having a request count and a response count associated therewith where the request count does not equal the response count;
wherein each respective payload comprises a transaction identification and a direction associated with each respective request.

12. The system of claim 11, further comprising:
a content addressable memory (CAM) configured to store payloads of the previous ones of the requests.

13. The system of claim 12, further comprising:
update logic configured to update respective state information for a previous one of the requests when a transaction identification associated with the current one of the requests corresponds to a transaction identification associated with the previous one of the requests;
wherein the state information comprises the request count and the response count.

* * * * *